United States Patent
Hamlin et al.

(10) Patent No.: US 11,240,239 B2
(45) Date of Patent: Feb. 1, 2022

(54) APPARATUS AND METHOD FOR SHARED CREDENTIAL AUTHENTICATION

(71) Applicant: DELL PRODUCTS, LP, Round Rock, TX (US)

(72) Inventors: Daniel L. Hamlin, Round Rock, TX (US); Charles D. Robison, Buford, GA (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 16/057,223

(22) Filed: Aug. 7, 2018

(65) Prior Publication Data

US 2020/0053080 A1     Feb. 13, 2020

(51) Int. Cl.
*H04L 29/06* (2006.01)
*H04W 12/06* (2021.01)

(52) U.S. Cl.
CPC ........ *H04L 63/0884* (2013.01); *H04L 63/102* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 10,657,242 B1* | 5/2020 | Xia | G06F 21/35 |
| 2011/0269423 A1 | 11/2011 | Schell et al. | |
| 2016/0127352 A1* | 5/2016 | Xu | H04L 63/08 726/8 |
| 2017/0244555 A1* | 8/2017 | Beiter | G06K 19/06028 |
| 2018/0109947 A1 | 4/2018 | Kim et al. | |
| 2018/0184293 A1 | 6/2018 | Wozniak et al. | |
| 2019/0089693 A1* | 3/2019 | Ding | H04L 63/0807 |
| 2019/0207927 A1* | 7/2019 | Lakhani | H04L 9/3268 |
| 2019/0289017 A1* | 9/2019 | Agarwal | H04L 63/0838 |
| 2019/0394187 A1* | 12/2019 | Fletcher | H04L 63/0807 |

* cited by examiner

*Primary Examiner* — Arezoo Sherkat
(74) *Attorney, Agent, or Firm* — Larson Newman, LLP

(57) ABSTRACT

An authentication system for providing shared credential authentication includes a client information handling (IHS) system having a resource service application, and a mobile IHS having a shared authentication application. The shared authentication token indicates that an authenticated state between the client IHS and the mobile IHS exists. The resource service application receives a request to access the resource, and sends an authentication request to an authentication server to authorize access to the resource. The shared authentication application receives a query from the authentication server to verify a status of a shared authentication token, and, when the shared authentication token is valid, responds to the query that the shared authentication token is valid. The resource service application further receives a response to the authentication request, and grants access to the resource when the authentication token indicates that the shared authentication token is valid.

14 Claims, 2 Drawing Sheets

APPARATUS AND METHOD FOR SHARED CREDENTIAL AUTHENTICATION

FIELD OF THE DISCLOSURE

This disclosure generally relates to information handling systems, and more particularly relates to sharing credential authentication in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An authentication system for providing shared credential authentication may include a client information handling (IHS) system having a resource service application, and a mobile IHS having a shared authentication application. The shared authentication token may indicate that an authenticated state between the client IHS and the mobile IHS exists. The resource service application may receive a request to access the resource, and send an authentication request to an authentication server to authorize access to the resource. The shared authentication application may receive a query from the authentication server to verify a status of a shared authentication token, and when the shared authentication token is valid, respond to the query that the shared authentication token is valid. The resource service application may further receive a response to the authentication request, and grant access to the resource when the authentication token indicates that the shared authentication token is valid.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
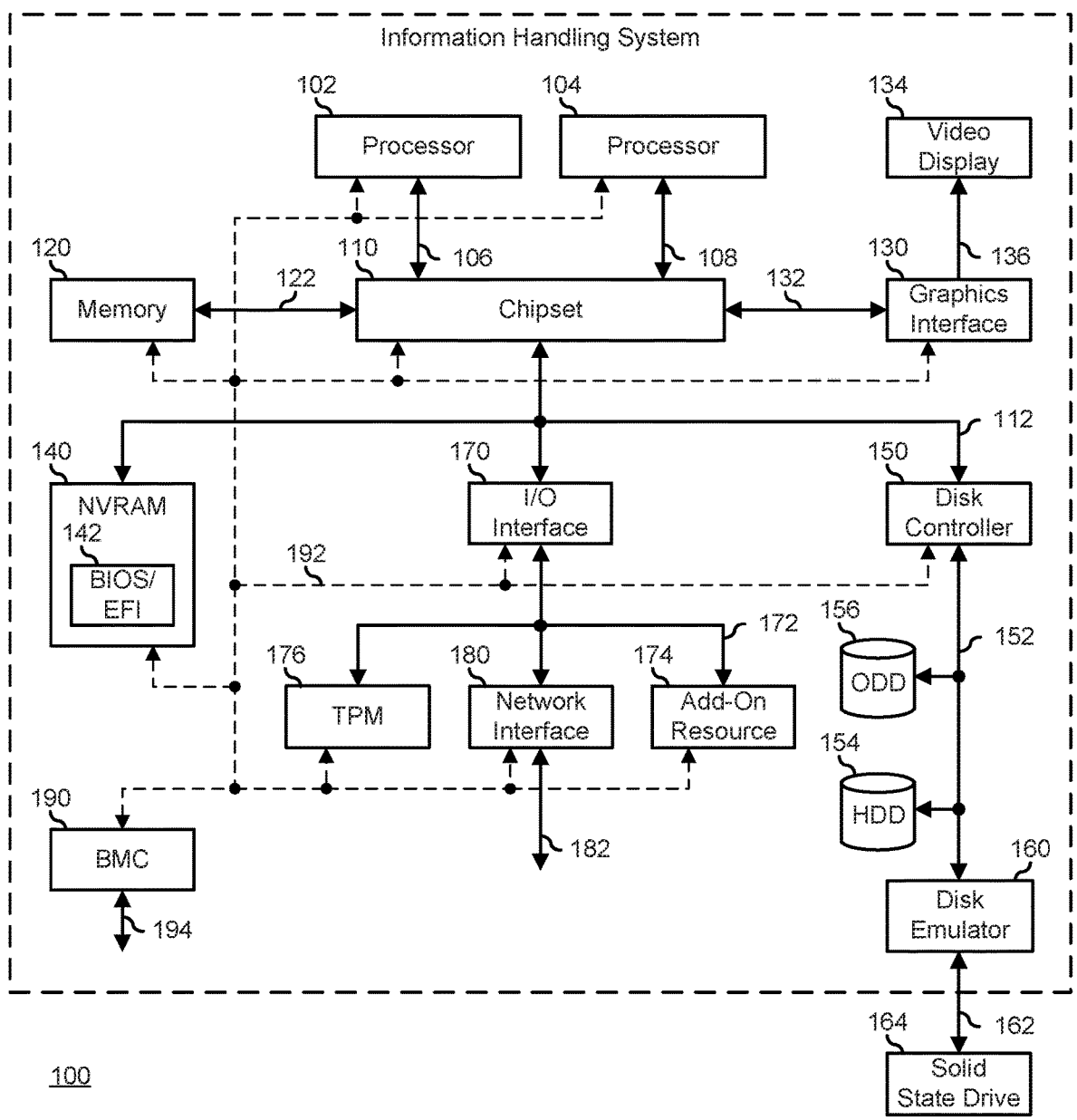
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (e.g., a Web Services Management (WS-MAN) interface, a Management Component Transport Protocol (MCTP) or, a Redfish interface), various vendor defined interfaces (e.g., a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (e.g., a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 provides secure access to various resources of the information handling system or of other network-based resources that are connected to the information handling system via one or more interface of network interface 180. For example, information handling system 100 may employ a hierarchical authentication and access scheme that permits a user of the information handling system to have different levels of access to the secure resources based upon various authentication credentials that are provided by the user. Further, the individual secure resources, and particularly web-based resources, may each employ their own authentication and access schemes based upon authentication credentials that are provided by the user for access to the various secure resources. As such a user may be required to provide login credentials to access the OS of information handling system 100, and to provide different login credentials to access each of a virtual private network (VPN), an authenticated web-based service such as Facebook or Google, a payment or banking network, or the like. Thus, in the course of a session using information handling system 100, the user may be required to provide a myriad of login credentials at various times in the session, based upon the usage to which the user puts the information handling system.

Figure 2:
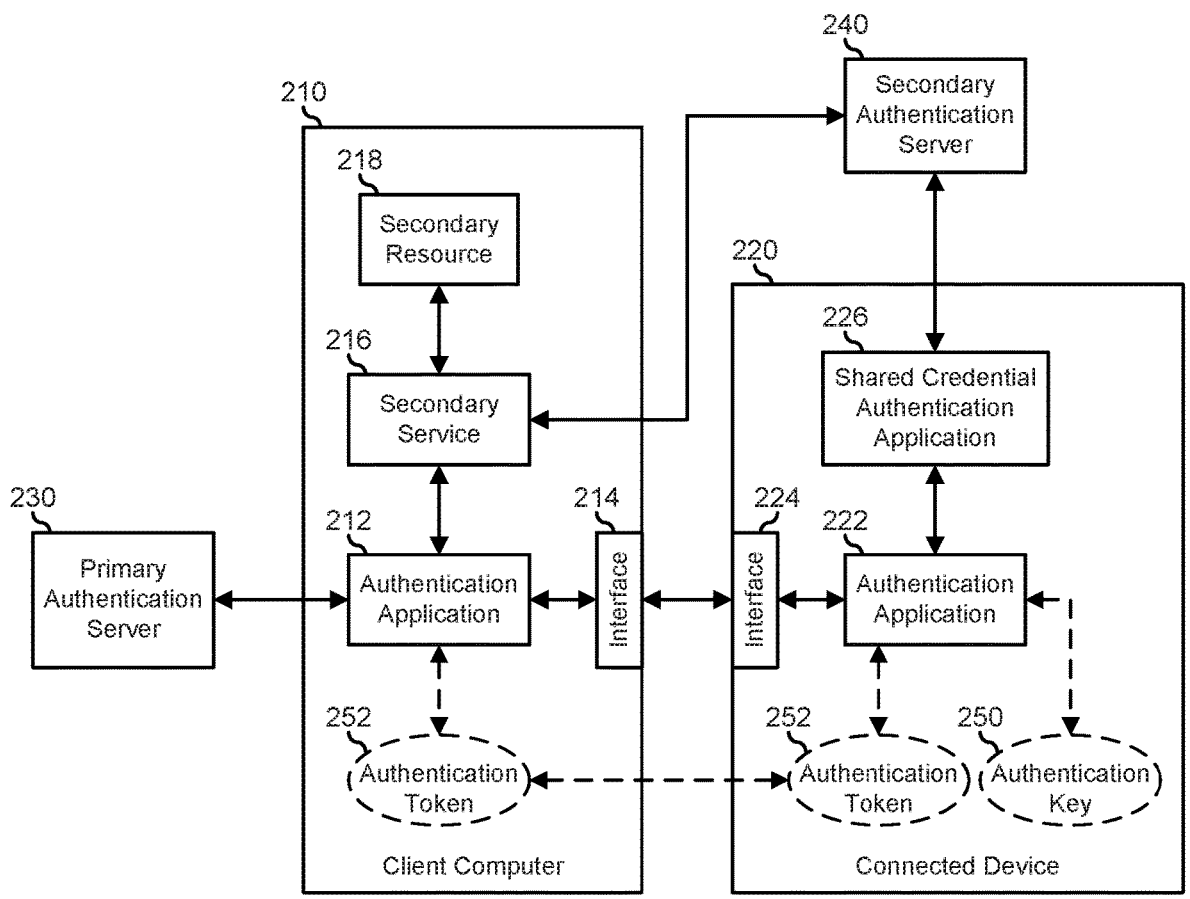
FIG. 2 is a block diagram of an authentication system according to an embodiment of the present disclosure.

FIG. 2 illustrates an authentication system 200 including a client computer 210, a connected device 220, a primary authentication server 230, and a secondary authentication server 240. Client computer 210 represents an information handling system similar to information handling system 100 and includes an authentication application 212, a connected device interface 214, a secondary service 216, and a secondary resource 218. Authentication application 212 represents a standardized framework for authenticating a user of client computer 210 to operate and to have access to the resources of the client computer. In a particular embodiment, authentication application 212 operates to query primary authentication server 230 with various authentication tokens and receives authentication credentials from the primary authentication server when the user of client computer 210 is authorized to operate and have access to the resources of the client computer. An example of an authentication application can include one or more applications or suite of applications that implement a Companion Device Framework/Client-to-Authenticator Protocol (CDF/CTAP). An example of primary authentication server 230 can include an Active Directory server. The functions and features of an authentication application similar to authentication application 212 in authenticating a user of a client computer via a primary authentication server are known in the art and will not be further discussed herein, except as may be necessary to further illustrate the present disclosure. The functions and features of connected device interface 214, secondary service 216, and secondary resource 218 will be described further below.

Connected device 220 represents an information handling system similar to information handling system 100 and includes an authentication application 222, a connected device interface 224, and a shared credential authentication application 226. Authentication application 222 represents a standardized framework that is compatible with authentication application 212 for authenticating connected device 222 to client computer 210 to operate and to share access to the resources of the client computer and the connected device. Here, connected device interfaces 214 and 224 represent communication interfaces that are configured to permit data and information communication between client computer 210 and connected device 220. In particular, connected device interfaces 214 and 224 provide for wireless communication between client computer 210 and connected device 220, where the connectivity is provided based upon the proximity of the client computer and the connected device to each other. As such, client computer 210 is wirelessly connected to connected device 220 via a wireless link established between connected device interfaces 212 and 214. Examples of connected device interfaces 212 and 214 can include various wireless wide-area network (WWAN) interface devices including various wireless cellular interface devices, WiMAX (IEEE 802.16) interface devices, or the like, wireless local area network (WLAN) interface devices including WiFi (IEEE 802.11) interface devices, wireless personal area network (WPAN) interface devices including Bluetooth interface devices, Bluetooth-Low-Energy (BLE) interface devices, or the like, Near Field Communication (NFC) interface devices, or a combination thereof.

When client computer 210 and connected device 220 are brought within proximity of each other, a handshaking process for forming the wireless link between connected device interfaces 214 and 224 is performed. Here, proximity is defined by the physical characteristics of connected device interfaces 214 and 224 and the particular wireless communication standard under which they operate. Once the wireless link is established between connected device interfaces 214 and 224, authentication applications 212 and 222 initiate a process for authenticating the access of the resources of client computer 210 and of connected device 220.

In a particular embodiment, authentication applications 212 and 222 operate to provide a CDF/CTAP environment. Here, when the wireless link is established between connected device interfaces 214 and 224, authentication application 222 requests authentication from authentication application 212, and a user of client computer 210 provides authentication credentials, such as a username/password log in, a biometric authentication credential, or the like to authenticate that the user is authorized to utilize the resources of connected device 220. From the authentication credentials, authentication application 222 derives an authentication key 250 that represents that the user of client computer 210 is authorized to utilize the resources of connected device 220, and creates an authentication token 252 that is shared with authentication application 212. Authentication token 252 represents the authenticated status between client computer 210 and connected device 220. As such, authentication application 212 maintains the validity of authentication token 252 on client computer 210 only as long as the wireless link between connected device interfaces 214 and 224 remains intact. As soon as the wireless link is lost, authentication application 212 invalidates authentication token 252, and any subsequent reassertion of the wireless link between connected device interfaces 214 and 224 must be accompanied by a reauthentication process between client computer 210 and connected device 220. In this way, the maintenance of the wireless link serves to ensure a secure and recognized authentication state between client computer 210 and connected device 220. Similarly, authentication application 222 maintains the validity of authentication token 252 on connected device 220 only as long as the wireless link between connected device interfaces 214 and 224 remains intact, and as soon as the wireless link is lost, authentication application 222 invalidates authentication token 252. In this way, the maintenance of the wireless link operates to ensure that the authenticated user of client computer 210 is maintained as the authenticated user and to maintain secure access to the resources of connected device 220.

Secondary service 216 represents an application running on client computer 210 that operates to permit the user of the client computer to access secondary resource 218. As illustrated, secondary resource 218 represents various secure resources of client system 210, but this is not necessarily so, and the secondary resource may also be outside of the client system. For example, secondary resource 218 may represent a virtual private network (VPN) access established on a network device of client system 210, a network or Internet-based service, a payment or banking transaction service, or the like. As such, secondary resource 218 is characterized by the fact that the user of client computer 210 does not have native access granted to the secondary resource by virtue of the client's login status on an operating system of the client computer, or the existence of an authenticated state between the client computer and connected device 220. Instead, the user of client system 210 is required to be authenticated to the use of secondary resource 218 through secondary service 216, before being granted access to the secondary resource. In a particular embodiment, secondary service 216 operates to provide a login or authentication session for the user to provide authentication credentials to permit access to secondary resource 218.

In another embodiment, when the user of client computer 210 uses secondary service 216 to access secondary resource 218, the secondary service initiates an authentication process that is based upon the status of authentication token 252 between client computer 210 and connected device 220. First, secondary service 216 sends an authentication request to secondary authentication server 240. The authentication request includes identifying information for client computer 210, such as a machine id, and for identifying information for the user of the client computer, such as a user name. Here, secondary authentication server 240 is associated with secondary resource 218 such that the secondary authentication server authenticates the user of client computer 210 prior to granting the user access to the secondary resource. For example, where secondary resource 218 represents a VPN, secondary authentication server 240 may represent a server associated with the VPN that operates to authenticate access requests to the VPN. In another example, where secondary resource 218 represents an Internet-based service, such as Facebook, Google, or the like, secondary authentication server 240 may represent an authentication server associated with the Internet-based service that operates to authenticate access requests to the Internet-based service. In yet another example, where secondary resource 218 represents a payment or banking transaction service, secondary authentication server 240 may represent an authentication server associated with the payment or banking transaction service that operates to authenticate access requests to the payment or banking transaction service.

Here, rather than providing a login or authentication session for the user to provide authentication credentials to permit access to secondary resource 218, secondary authentication server 240 operates to send a query to shared credential authentication application 226 in connected device 220 to determine the connection status between client computer 210 and the connected device. In particular, secondary authentication server 240 is preconfigured with information that relates client computer 210 and the user of the client computer with connected device 220. As such, when the secondary authentication server receives the identifying information for client computer 210 and for the user of the client computer from the authentication request from secondary service 216, the secondary authentication resource determines send the query to connected device 210 based upon the preconfigured association information. When shared credential authentication application 226 receives the query from secondary authentication server 240, the shared credential authentication application request authentication application 222 to provide the connection status between client computer 210 and connected device 220.

If client computer 210 and connected device 220 are not connected and do not retain shared authentication token 252, then shared credential authentication application 226 receives an indication that the client computer and the connected device do not share the authentication token. Then shared credential authentication application 226 informs secondary authentication server 240 that the connection between client computer 210 and connected device 220 is not authenticated, and the secondary authentication server provides an indication to secondary service 216 to deny the user access to secondary resource 218. In this case, secondary service 216 can operate to provide a login or authentication session for the user to provide authentication credentials to permit access to secondary resource 218.

If client computer 210 and connected device 220 are connected and retain shared authentication token 252, then shared credential authentication application 226 receives confirmation that the client computer and the connected device share the authentication token. Then shared credential authentication application 226 informs secondary authentication server 240 that the connection between client computer 210 and connected device 220 is authenticated, and the secondary authentication server provides an indication to secondary service 216 to grant the user access to secondary resource 218. In a particular case of the present embodiment, when secondary service 218 sends the authentication request to secondary authentication server 240, the authentication request includes authentication token 252, or a hash thereof, along with the authentication request. Then further, when shared credential authentication application 226 informs secondary authentication server 240 that the connection between client computer 210 and connected device 220 is authenticated, the shared credential authentication application further includes authentication token 252, or a hash thereof. Then, secondary authentication server 240 compares the received versions of authentication token 252 to further verify that the connection status between client computer 210 and connected device 220 is authenticated.

If, at some later point in time, the authenticated connection between client computer 210 and connected device 220 is lost, authentication applications 212 and 222 each invalidate authentication token 252, as described above. Here, authentication application 222 further indicates that client computer 210 and connected device 220 no longer share the authentication token. Then shared credential authentication application 226 informs secondary authentication server 240 that the connection between client computer 210 and connected device 220 has been lost, and the secondary authentication server provides an indication to secondary service 216 to deny the user access to secondary resource 218. In this case, secondary service 216 may again operate to provide a login or authentication session for the user to provide authentication credentials to permit access to secondary resource 218.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An authentication system for providing shared credential authentication, the authentication system comprising:
   a client information handling system (IHS) including a resource and a first processor to provide a resource service application; and
   a mobile information handling system (IHS) including a second processor to provide a shared authentication application; wherein:
   the client IHS authenticates, via a primary authentication server, a user of the client IHS to access the client IHS, wherein the primary authentication server is an Active Directory server;
   the resource service application receives a request to access the resource, and sends an authentication request to a secondary authentication server to authorize access to the resource;
   the shared authentication application receives a query from the secondary authentication server to verify a status of a first shared authentication token, and when the first shared authentication token is valid, responds to the query that the first shared authentication token is valid, the first shared authentication token indicating that an authenticated state between the client IHS and the mobile IHS exists;
   the resource service application further receives a response to the authentication request, and grants access to the resource when the first shared authentication token indicates that the first shared authentication token is valid;

the client IHS further provides a first authentication application;

the mobile IHS further provides a second authentication application;

the first and second authentication applications determine whether or not the client IHS and the mobile IHS are communicatively coupled;

the second authentication application
- i) requests authentication credentials from the first authentication application, the authentication credentials authenticating that the client IHS is authorized to utilize the mobile IHS,
- ii) receives the authentication credentials,
- iii) creates an authentication key that represents that the client IHS is authorized to utilize the mobile IHS based upon the authentication credentials,
- iv) and creates a second shared authentication token and a hash thereof based on the authentication key, and after creating the second shared authentication token,
- v) invalidates the second shared authentication token in response to determining that the client IHS and the mobile IHS are not communicatively coupled.

2. The authentication system of claim 1, wherein the shared authentication application further provides a first update to the secondary authentication server that the second shared authentication token is invalid in response to invalidating the second shared authentication token.

3. The authentication system of claim 2, wherein the resource service application further receives a second update from the secondary authentication server that the second shared authentication token is invalid.

4. The authentication system of claim 3, wherein the resource service application further denies access to the resource in response to receiving the second update.

5. The authentication system of claim 3, wherein the resource service application further provides an authentication process to the user of the client IHS in further response to receiving the second update.

6. The authentication system of claim 1, wherein:

the client IRS further includes a first communication interface;

the mobile IHS further includes a second communication interface; and the first and second authentication applications further determine that the client IHS and the mobile IHS are communicatively coupled when the first and second communication interfaces are coupled.

7. The authentication system of claim 3, wherein the resource includes one of a virtual private network, a web service, and a bank payment system.

8. A method for providing shared credential authentication, the method comprising:

authenticating, via a primary authentication server, a user of a client information handling system (IHS) to access the client IHS, wherein the primary authentication server is an Active Directory server;

receiving, by a resource service application of the client IHS, a request to access a resource of the client IHS;

sending, by the resource service application, an authentication request to a secondary authentication server to authorize access to the resource;

receiving, by a shared authentication application of a mobile information handling system (IHS), a query from the secondary authentication server to verify a status of a first shared authentication token, the first shared authentication token indicating that an authenticated state between the client IHS and the mobile IHS exists;

responding, by the shared authentication application when the first shared authentication token is valid, to the query that the shared authentication token is valid;

receiving, by the resource service application, a response to the authentication request;

granting, by the resource service application, access to the resource when the first shared authentication token indicates that the shared authentication to ken is valid;

determining, by a first authentication application of the client IHS and by a second authentication application of the mobile IHS, whether or not the client information handling system and the mobile information handling system are communicatively coupled;

requesting, by the second authentication application authentication credentials from the first authentication application, the authentication credentials authenticating that the client IHS is authorized to utilize the mobile IHS receiving, by the second authentication application, the authentication credentials;

creating, by the second authentication application, an authentication key that represents that the client IHS is authorized to utilize the mobile IHS;

creating, by the second authentication application, a second shared authentication token based on the authentication key; and after creating the second shared authentication token, invalidating the second shared authentication token in response to determining that the client IHS and the mobile IHS are not communicatively coupled.

9. The method of claim 8, further comprising: providing, by the shared authentication application, a first update to the secondary authentication server that the second shared authentication token is invalid in response to invalidating the second shared authentication token.

10. The method of claim 9, further comprising: receiving, by the resource service application, a second update from the secondary authentication server that the second shared authentication token is invalid.

11. The method of claim 10, further comprising: denying, by the resource service application, access to the resource in response to receiving the second update.

12. The method of claim 10, further comprising: providing, by the resource service application, an authentication process to the user of the client IHS in further response to receiving the second update.

13. The method of claim 9, further comprising:

determining, by the shared authentication application, that the client IHS and the mobile IHS are communicatively coupled when the first and second communication interfaces are coupled.

14. The method of claim 8, wherein the resource includes one of a virtual private network, a web service, and a bank payment system.

* * * * *

UNITED STATES PATENT AND TRADEMARK OFFICE
CERTIFICATE OF CORRECTION

PATENT NO. : 11,240,239 B2
APPLICATION NO. : 16/057223
DATED : February 1, 2022
INVENTOR(S) : Daniel L. Hamlin and Charles D. Robison It is certified that error appears in the above-identified patent and that said Letters Patent is hereby corrected as shown below:

In the Claims

Column 11, Line 41: Please change "IRS" to --IHS--

Column 12, Line 14: Please change "to ken" to --token--

Signed and Sealed this
Nineteenth Day of April, 2022

Katherine Kelly Vidal
*Director of the United States Patent and Trademark Office*